(12) United States Patent
Kley

(10) Patent No.: US 7,266,998 B2
(45) Date of Patent: Sep. 11, 2007

(54) METHOD AND APPARATUS FOR MICROMACHINES, MICROSTRUCTURES, NANOMACHINES AND NANOSTRUCTURES

(75) Inventor: Victor B. Kley, Berkeley, CA (US)

(73) Assignee: General Nanotechnology LLC, Berkeley, CA (US)

( * ) Notice: Subject to any disclaimer, the term of this patent is extended or adjusted under 35 U.S.C. 154(b) by 0 days.

(21) Appl. No.: 10/981,142

(22) Filed: Nov. 3, 2004

(65) Prior Publication Data

US 2005/0172739 A1    Aug. 11, 2005

Related U.S. Application Data

(62) Division of application No. 10/305,776, filed on Nov. 26, 2002, now Pat. No. 6,813,937.

(60) Provisional application No. 60/334,181, filed on Nov. 28, 2001.

(51) Int. Cl.
*G01B 5/28* (2006.01)

(52) U.S. Cl. ............... 73/105; 73/862; 73/862.634; 73/862.639; 73/504.15

(58) Field of Classification Search ............ 73/105, 73/862, 862.634, 862.639, 504.15
See application file for complete search history.

(56) References Cited

U.S. PATENT DOCUMENTS

| | | | |
|---|---|---|---|
| 3,586,865 A | 6/1971 | Baker et al. | |
| 3,812,288 A | 5/1974 | Walsh et al. | |
| 4,115,806 A | 9/1978 | Morton | |
| 4,604,520 A | 8/1986 | Pohl | |
| 4,672,559 A | 6/1987 | Jansson et al. | |
| 4,673,477 A | 6/1987 | Ramalingram et al. | |
| RE32,457 E | 7/1987 | Matey | |
| 4,681,451 A | 7/1987 | Guerra et al. | |
| 4,697,594 A | 10/1987 | Mayo, Jr. | |
| 4,793,201 A | 12/1988 | Kanai et al. | |
| 4,831,614 A | 5/1989 | Duerig | |
| 4,866,986 A | 9/1989 | Cichanski | |
| 4,907,195 A | 3/1990 | Kazan et al. | |
| 4,924,091 A | 5/1990 | Hansma et al. | |
| 4,954,704 A | 9/1990 | Elings et al. | |
| 4,999,495 A | 3/1991 | Miyata et al. | |
| 5,001,344 A | 3/1991 | Kato et al. | |
| 5,010,249 A | 4/1991 | Nishikawa | |

(Continued)

FOREIGN PATENT DOCUMENTS

EP        0325056        7/1989

(Continued)

OTHER PUBLICATIONS

Ager et al., "Multilayer hard carbon films with low wear rates," *Surface and Coatings Technology*, 91:91-94 (1997).

(Continued)

*Primary Examiner*—Hezron Williams
*Assistant Examiner*—Rodney Frank
(74) *Attorney, Agent, or Firm*—Townsend & Townsend & Crew LLP

(57) ABSTRACT

Parts and structures are described for micro and nano machines and the creation of macro structures with nano and micro layers of special materials to provide improved performance.

8 Claims, 8 Drawing Sheets

U.S. PATENT DOCUMENTS

| | | | |
|---|---|---|---|
| 5,015,850 A | 5/1991 | Zdeblick |
| 5,018,865 A | 5/1991 | Ferrell et al. |
| 5,025,346 A | 6/1991 | Tang |
| 5,038,322 A | 8/1991 | Van Loenen |
| 5,043,577 A | 8/1991 | Pohl |
| 5,047,633 A | 9/1991 | Finlan et al. |
| 5,047,649 A | 9/1991 | Hodgson et al. |
| 5,072,116 A | 12/1991 | Kawade et al. |
| 5,081,390 A | 1/1992 | Elings et al. |
| 5,105,305 A | 4/1992 | Betzig et al. |
| 5,107,112 A | 4/1992 | Yanagisawa et al. |
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,307 A | 9/1992 | Kopelman |
| 5,155,589 A | 10/1992 | Gere |
| 5,166,520 A | 11/1992 | Prater et al. |
| 5,187,367 A | 2/1993 | Miyazaki |
| RE34,214 E | 4/1993 | Carlsson et al. |
| 5,210,410 A | 5/1993 | Barret |
| 5,216,631 A | 6/1993 | Sliwa |
| 5,220,555 A | 6/1993 | Yanagisawa |
| 5,231,286 A | 7/1993 | Kajimura et al. |
| 5,241,527 A | 8/1993 | Eguchi |
| 5,249,077 A | 9/1993 | Laronga |
| 5,252,835 A | 10/1993 | Lieber et al. |
| 5,253,515 A | 10/1993 | Toda et al. |
| 5,254,209 A | 10/1993 | Schmidt et al. |
| 5,254,854 A | 10/1993 | Betzig |
| 5,260,824 A | 11/1993 | Okada et al. |
| 5,276,672 A | 1/1994 | Miyazaki |
| 5,278,704 A | 1/1994 | Matsuda |
| 5,283,437 A | 2/1994 | Greshner et al. |
| 5,289,004 A | 2/1994 | Okada et al. |
| 5,289,408 A | 2/1994 | Mimura |
| 5,297,130 A | 3/1994 | Tagawa |
| 5,299,184 A | 3/1994 | Yamano |
| 5,302,239 A | 4/1994 | Roe et al. |
| 5,307,311 A | 4/1994 | Sliwa |
| 5,308,974 A | 5/1994 | Elings et al. |
| 5,317,152 A | 5/1994 | Takamatsu |
| 5,317,533 A | 5/1994 | Quate |
| 5,319,961 A | 6/1994 | Matsuyama et al. |
| 5,319,977 A | 6/1994 | Quate et al. |
| 5,322,735 A | 6/1994 | Fridez et al. |
| RE34,708 E | 8/1994 | Hansma et al. |
| 5,338,932 A | 8/1994 | Theodore et al. |
| 5,343,460 A | 8/1994 | Miyazaki |
| 5,349,735 A | 9/1994 | Kawase |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,357,787 A * | 10/1994 | Kado et al. ............ 73/105 |
| 5,360,977 A | 11/1994 | Onuki et al. |
| 5,362,963 A | 11/1994 | Kopelman et al. |
| 5,373,494 A | 12/1994 | Kawagishi |
| 5,389,475 A | 2/1995 | Yanagisawa |
| 5,392,275 A | 2/1995 | Kawada et al. |
| 5,393,647 A | 2/1995 | Neukermans et al. |
| 5,396,483 A | 3/1995 | Matsuda et al. |
| 5,408,094 A | 4/1995 | Kajimura |
| 5,412,641 A | 5/1995 | Shinjo |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A | 5/1995 | Elings et al. |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi |
| 5,495,109 A | 2/1996 | Lindsay et al. |
| 5,502,306 A | 3/1996 | Meisburger et al. |
| 5,506,829 A | 4/1996 | Yagi |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |
| 5,583,286 A | 12/1996 | Matsuyama |
| 5,602,820 A | 2/1997 | Wickramasinghe et al. |
| 5,610,898 A | 3/1997 | Takimoto |
| 5,623,476 A | 4/1997 | Eguchi |
| 5,634,230 A | 6/1997 | Maurer |
| 5,644,512 A | 7/1997 | Chernoff et al. |
| 5,679,952 A | 10/1997 | Lutwyche et al. |
| 5,717,680 A | 2/1998 | Yamano |
| 5,721,721 A | 2/1998 | Yanagisawa |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bougoin et al. |
| 5,821,410 A | 10/1998 | Xiang et al. |
| 5,825,670 A | 10/1998 | Chernoff et al. |
| 5,865,978 A | 2/1999 | Cohen |
| 5,874,726 A | 2/1999 | Haydon |
| 5,883,387 A | 3/1999 | Matsuyama et al. |
| 5,922,214 A | 7/1999 | Liu et al. |
| 5,929,438 A * | 7/1999 | Suzuki et al. ............ 250/306 |
| 6,031,756 A | 2/2000 | Gimsewski et al. |
| 6,066,265 A | 5/2000 | Galvin et al. |
| 6,073,484 A * | 6/2000 | Miller et al. ............ 73/105 |
| 6,101,164 A | 8/2000 | Kado et al. |
| 6,144,028 A | 11/2000 | Kley |
| 6,173,604 B1 | 1/2001 | Xiang et al. |
| 6,199,269 B1 | 3/2001 | Greco et al. |
| 6,201,226 B1 | 3/2001 | Shimada et al. |
| 6,229,138 B1 | 5/2001 | Kley |
| 6,229,607 B1 | 5/2001 | Shirai et al. |
| 6,229,609 B1 | 5/2001 | Muramatsu et al. |
| 6,232,597 B1 | 5/2001 | Kley |
| 6,239,426 B1 | 5/2001 | Muramatsu et al. |
| 6,242,734 B1 | 6/2001 | Kley |
| 6,249,747 B1 | 6/2001 | Bennig et al. |
| 6,252,226 B1 | 6/2001 | Kley |
| 6,265,711 B1 | 7/2001 | Kley |
| 6,281,491 B1 | 8/2001 | Kley |
| 6,337,479 B1 | 1/2002 | Kley |
| 6,339,217 B1 | 1/2002 | Kley |
| 6,340,813 B1 | 1/2002 | Tominaga et al. |
| 6,353,219 B1 | 3/2002 | Kley |
| 6,369,379 B1 | 4/2002 | Kley |
| 6,396,054 B1 | 5/2002 | Kley |
| 6,507,553 B2 | 1/2003 | Kley |
| 6,515,277 B1 | 2/2003 | Kley |
| 6,517,249 B1 | 2/2003 | Doll |
| 6,573,369 B2 | 6/2003 | Henderson et al. |
| 6,614,227 B2 | 9/2003 | Ookubo |
| 6,724,712 B2 | 4/2004 | Kley |
| 6,737,331 B1 | 5/2004 | Lewis et al. |
| 6,752,008 B1 | 6/2004 | Kley |
| 6,787,768 B1 | 9/2004 | Kley et al. |
| 6,802,646 B1 | 10/2004 | Kley |
| 6,813,937 B2 | 11/2004 | Kley |
| 2002/0007667 A1 | 1/2002 | Pohl et al. |
| 2002/0117611 A1 | 8/2002 | Kley |
| 2002/0135755 A1 | 9/2002 | Kley |
| 2002/0189330 A1 | 12/2002 | Mancevski et al. |
| 2003/0012657 A1 | 1/2003 | Marr et al. |

| | | |
|---|---|---|
| 2003/0027354 A1 | 2/2003 | Geli |
| 2003/0062193 A1 | 4/2003 | Thaysen et al. |
| 2003/0089182 A1 | 5/2003 | Thaysen et al. |
| 2004/0118192 A1 | 6/2004 | Kley |

FOREIGN PATENT DOCUMENTS

| | | |
|---|---|---|
| JP | 61-133065 | 6/1986 |
| JP | 01-262403 | 10/1989 |
| JP | 7-105580 | 4/1995 |
| WO | WO96/03641 A1 | 2/1996 |
| WO | WO97/04449 | 2/1997 |
| WO | WO98/34092 A2 | 8/1998 |
| WO | WO 01/03157 | 1/2001 |
| WO | WO 03/046473 | 6/2003 |
| WO | WO 2004/023490 | 3/2004 |

OTHER PUBLICATIONS

Betzig et al "Near-Field Optics: Microscopy Spectroscopy and Surface Modification Beyond the Diffraction Limit" Science 257:189-195 (1992).

Dai et al. "Nanotubes as nanoprobes in scanning probe microscopy," Nature 384:147-150 (1996).

Davis "Deposition characterization and device development in diamond silicon carbide and gallium nitride thin films" J. Vac. Sci. Technol. 11:829-837 (1993).

Diaz et al. "An Improved Fabrication Technique for Porous Silicon," Rev. Sci. Instrum.64: 507-509 (1993).

Givargizov et al "Growth of diamond particles on sharpened silicon tips" Materials Letters 18:61-63 (1993).

Gomyou et al. "Effect of Electrochemical Treatments on the Photoluminescence from Porous Silicon," J. Electrochem. Soc., 139: L86-L88 (1992).

Jaschke et al. "Deposition of Organic Material by the Tip of a Scanning Force Microscope," Langmuir 11:1061-1064 (1995).

Nossarzewska-Orlowska et al. "Photoluminescence Properties of Porous Silicon Prepared by Electrochemical Etching of Si Epitaxial Layer," Acta Physica Polonica A 84:713-716 (1993).

Rasmussen et al. "Fabrication of an All-metal Atomic Force Microscope Probe," IEEE Proceedings of the International Conference on Solid State Sensors and Actuators, Chicago, (1997).

Rossow et al. "Influence of the Formation Conditions on the Microstructure of Porous Silicon Layers Studied by Spectroscopic Ellipsometry," Thin Solid Films 255:5-8 (1995).

Smestad et al. "Photovoltaic Response in Electrochemically Prepared Photoluminescent Porous Silicon," Solar Energy Materials and Solar Cells 26:277-283 (1992).

Tang "Electrostatic comb drive for resonant sensor and actuator applications," Abstract of dissertation at the University of California at Berkeley (1990).

Toledo-Crow et al "Near-field differential scanning optical microscope with atomic force regulation" Appl. Phys. Lett. 60:2957-42959 (1992).

Van Hulst et al "Near-field optical microscope using a silicon-nitride probe" Appl. Phys. Lett. 62:461-463 (1993).

Watson et al "The Radiation Patterns of Dielectric Rods—Experiment Theory" Journal of Applied Physics 19:661-670 (1948).

* cited by examiner

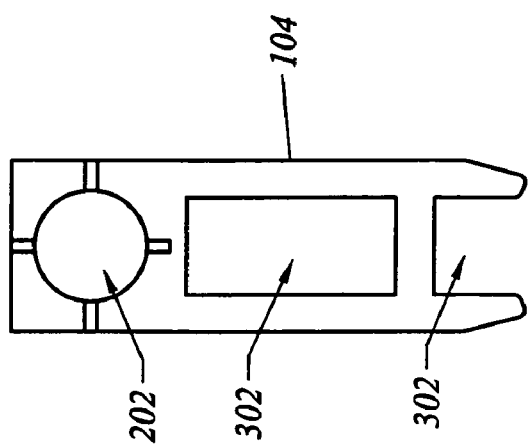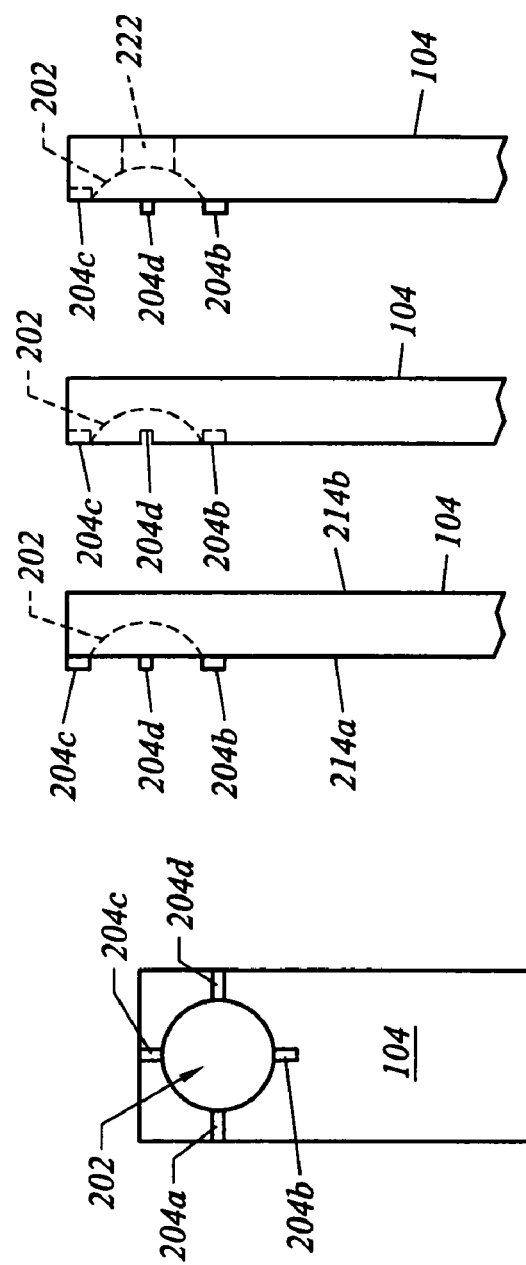
FIG. 2A  FIG. 2B  FIG. 2C
FIG. 3
FIG. 2

METHOD AND APPARATUS FOR MICROMACHINES, MICROSTRUCTURES, NANOMACHINES AND NANOSTRUCTURES

CROSS-REFERENCES TO RELATED APPLICATIONS

This application is a divisional of 10/305,776 filed Nov. 26, 2002 now U.S. Pat. No. 6,813,937, issued Nov. 9, 2004, which claims priority from U.S. Application No. 60/334,181, filed Nov. 28, 2001 by Victor B. Kley for "Cantilever, Nano & Micro Parts, and Diamond Knives."

This application is related to the following seven U.S. patent applications, the disclosures of each other application is incorporated by reference in its entirety for all purposes:

U.S. patent application Ser. No. 10/093,842, filed Mar. 7, 2002 by Victor B. Kley for "Nanomachining Method and Apparatus;"

U.S. patent application Ser. No. 10/094,408, filed Mar. 7, 2002 by Victor B. Kley for "Active Cantilever for Nanomachining and Metrology;"

U.S. patent application Ser. No. 10/094,411, filed Mar. 7, 2002 by Victor B. Kley for "Methods and Apparatus for Nanolapping;" and U.S. patent application Ser. No. 10/228,681, filed Aug. 26, 2002 by Victor B. Kley for "Active Cantilever for Nanomachining and Metrology."

The following U.S. patents are incorporated by reference in their entirety for all purposes:

U.S. Pat. No. 6,144,028, issued Nov. 7, 2000 to Victor B. Kley for "Scanning Probe Microscope Assembly and Method for Making Confocal, Spectrophotometric, Near-Field, and Scanning Probe Measurements and Associated Images;"

U.S. Pat. No. 6,252,226, issued Jun. 26, 2001 to Victor B. Kley for "Nanometer Scale Data Storage Device and Associated Positioning System;"

U.S. Pat. No. 6,337,479, issued Jan. 8, 2002 to Victor B. Kley for "Object Inspection and/or Modification System and Method;"

U.S. Pat. No. 6,339,217, issued Jan. 15, 2002 to Victor B. Kley for "Scanning Probe Microscope Assembly and Method for Making Confocal, Spectrophotometric, Near-Field, and Scanning Probe Measurements and Associated Images;"

U.S. Pat. No. 6,752,008 issued Jun. 22, 2004 to Victor B. Kley for "Method and Apparatus for Scanning in Scanning Probe Microscopy and Presenting Results;"

U.S. Pat. No. 6,787,768 issued Sep. 7, 2004 to Victor B. Kley and Robert T. LoBianco for "Method and Apparatus for Tool and Tip Design for Nanomachining and Measurement;" and U.S. Pat. No. 6,802,646 issued Oct. 12, 2004 to Victor B. Kley for "Low Friction Moving Interfaces in Micromachines and Nanomachines."

The disclosure of the following published PCT application is incorporated by reference in its entirety for all purposes:

WO 01/03157 (International Publication Date: Jan. 11, 2001) based on PCT Application No. PCT/US00/18041, filed Jun. 30, 2000 by Victor B. Kley for "Object Inspection and/or Modification System and Method."

BACKGROUND OF THE INVENTION

The present invention relates to micro-electromechanical systems (MEMS) and to Nano Electromechanical Systems (NEMS™). In particular, the present invention is directed to forming parts and structures for micro and nano machines and the creation of macro structures with nano and micro layers of special materials to provide improved performance.

In the foregoing listed related commonly owned issued patents and pending patent applications, various methods, apparatus, and techniques have been disclosed relating to micromachining and nanomachining technology. In U.S. patent application Ser. No. 10/094,408, various cantilever configurations are discussed, along with possible uses in the fabrication of very small machines. In U.S. patent application Ser. No. 10/093,842, U.S. patent application Ser. No. 10/093,947, and U.S. patent application Ser. No. 10/094,411, tools and techniques for performing micro and nano scale machining operations are discussed. In U.S. patent application Ser. No. 10/094,149, fabrication of MEMS components using diamond as a construction material to substantially eliminate stiction and friction is discussed.

The foregoing are fundamental technologies and techniques that can be used to pave the way to the world of the very small, where structures and machines are measured at micron and nanometer scales. What is needed are improvements to existing tools to facilitate their manufacture and to enhance their performance. There is a need for additional tools to facilitate the creation of ultra-small structures. Techniques and devices are needed for making very small mechanical components and machines such as micro and nano gears, bearings, journals, shafts, cutters, cams, cantilevers, pumps, simple, complex and planetary gear assemblies, latches, locks, calculators, angle drives, propellers, linear motion translators, unique diamond coatings arrangements for knifes and compensatory deformation of target surfaces to use the coating induced stress to create the final form. It is desirable to have useful nanostructures that can be fabricated by these tools which can then serve as building blocks for larger micromachines.

BRIEF SUMMARY OF THE INVENTION

An embodiment of a new smaller and improved cantilever MEMS design in accordance with the present invention is provisioned with features to facilitate the use of cantilever scanning probe microscopy. A cantilever design in accordance with the invention also facilitates the use tools suitable for micro- and nano-scale operations. A mounting plate to overcome present manufacturing limits and improve the overall yields of cantilever assemblies useful for direct nanomachining and metrology is disclosed.

Also disclosed is a geared pump in which the components use properties of diamond and silicon to form a simple high pressure gear pump which is capable of moving fluids from a reservoir chamber to and through very narrow channels and passages. Such a pump overcomes the present limitations of silicon MEMS pumps including their inability to develop high force (pressure) to overcome the Van der Waals and surface forces that inhibit fluid flow in narrow channels and passages.

In accordance with another aspect of the present invention, a diamond coating can be used to impart a desired shape to a substrate. Further in accordance with the invention, certain macro uses of a diamond coating can be applied to general surfaces to produces structures such as microscale knives.

BRIEF DESCRIPTION OF THE DRAWINGS

A further understanding of the nature and advantages of the present invention may be realized by reference to the remaining portions of the specification and the drawings:

FIGS. 2 and 2A-2C show schematic representations of cantilever tip variations in accordance with the present invention;

FIGS. 3 and 3A-3C are schematic representations of variations of the cantilever according to the invention;

DETAILED DESCRIPTION OF THE INVENTION

Figure 1:
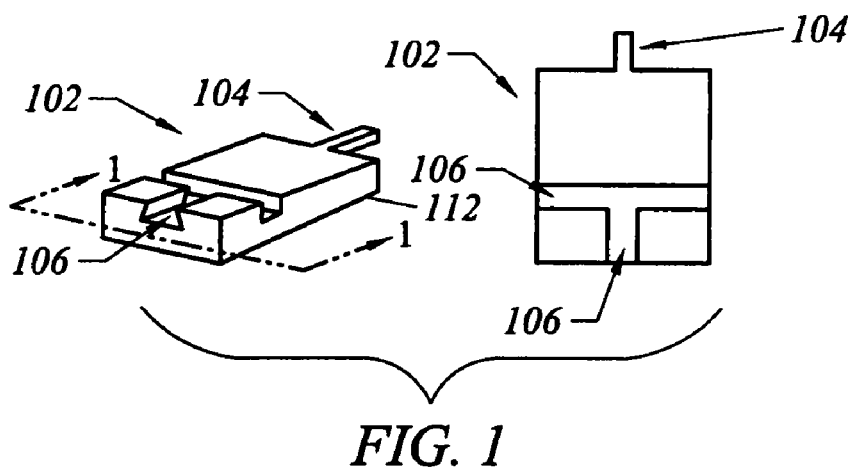
FIG. 1 is a schematic representation of a cantilever assembly in accordance with an aspect of the present invention, showing a perspective view and a top view.

FIG. 1 shows a perspective view and a top view of a cantilever assembly 102. A main body 112 serves as a mounting portion of the cantilever assembly. A flexural member extending from the main body constitutes a cantilever member 104. Recessed features 106 are formed in the main body 112 and serve as bonding channels. In accordance with the invention, the surface area of the cantilever assembly is no greater than three square millimeters (3 mm$^2$).

Figure 1A:
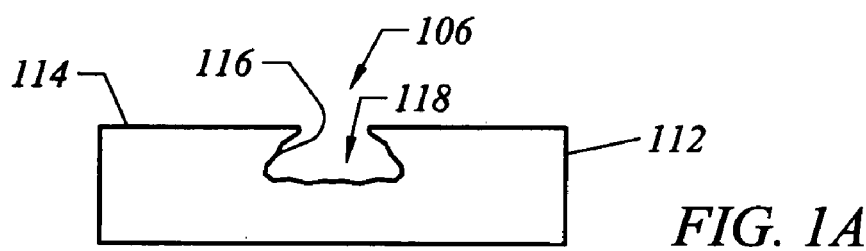
FIGS. 1A-1C show variations of bonding channels according to the invention.

The recessed features facilitate mounting the cantilever assembly to an intermediate mounting plate. In a particular aspect of the invention, the recessed features can provide reliable permanent bonding of the cantilever assembly to a larger support structure. Turn to FIGS. 1A-1C for a moment. The views shown in these figures are taken along view line 1-1 in FIG. 1. These views highlight example profiles of the recessed feature 106 according to the invention. In FIG. 1A, a schematic representation of the interior surface 116 of the recessed feature represents a roughened surface. This can be formed by chemical etching or reactive ion etching (RIE) techniques. The roughened surface provides increased surface area and "nooks-and-crannies" to achieve a secure bonding. For example, adhesives or solder or other flowable bonding material can be dispensed within the recessed feature and become securely attach to the roughened surface. This bonding system provides a secure bond without requiring the bonding material be applied past the top surface 114 of the main body 112, thus avoiding interfering with the scanning probe microscopy operations.

Figure 1B:
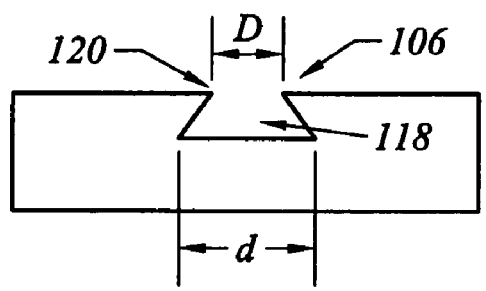
Figure 1C:
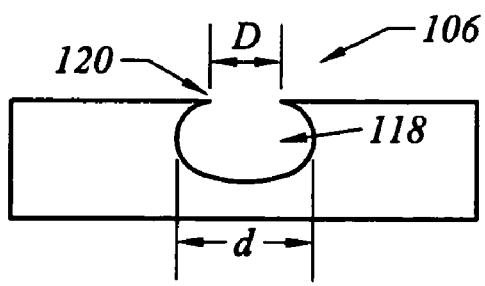

FIG. 1B shows another variation of the recessed feature 106. This can be formed lithographically or by other known conventional techniques. The profile shows an opening into the recessed feature that has a dimension (D) smaller than an interior dimension (d) in an interior region 118 of the recessed feature. FIG. 1C shows a similar recessed feature that might have been formed using an isotropic etch process. In both cases the opening dimension (D) is smaller than an interior dimension (d). Stated more generally, in accordance with these particular embodiments of the invention, the opening 120 of the recessed feature at least partially occludes the interior region 118 of the recessed feature.

Returning now to FIG. 1 it can be seen that the recessed features 106 form a contiguous T-shape. It can be appreciated that in other embodiments, discontinuous recessed features can be formed. The particular pattern may be determined depending on the particular structure of the cantilever assembly, or the particular environment of the scanning probe microscopy system.

To complete the discussion of the detail shown in FIG. 1, a lever arm 104 extends from the main body 112. This structure is a flexible member and constitutes the cantilever of the cantilever assembly 102. In one embodiment of the invention, the cantilever is integral with the main body. For example, the cantilever assembly can be fabricated from a silicon on insulator (SOI) wafer. The cantilever 104 can be a lithographically defined structure. It can be appreciated, however, that the cantilever can be a separately fabricated member that is subsequently attached to the main body during manufacture.

FIG. 2 schematically illustrates a cantilever 104 in accordance with an aspect of the invention. A recessed region 202 is formed into a major surface 214a of the cantilever in an end portion of the cantilever distal the main body 112. The recessed region can be used to as a receptacle or mount point for receiving a secondary object. As can be seen in the profile view of FIG. 2A, for example, the recessed region is shown as a bowl-shaped recess. However, such shape is not necessary. The recess can be formed to take on a shape that is suitable for a particular implementation.

The recessed region illustrated in FIG. 2 is shown with a circular-shaped outline. However, it can be appreciated that other outline shapes might be more suitable for attachment of a secondary object. The shape can be a substantially continuous form; e.g., elliptical, ovoid, etc. The shape can be triangular, quadrangular, pentagonal, and in general any regular or irregular polygonal shape.

To facilitate the attachment of a secondary object, one or more alignment features can be formed on the surface 214a. For example, FIG. 2 shows four such alignment features 204a-204d, though additional or fewer features can be provided if appropriate. The side views shown in FIGS. 2A-2C illustrate that the features can be recessed features or raised features. For example, FIG. 2A shows that the features 204b-204d are raised surface features. These can be formed, for example, by properly masking the surface of the cantilever 104 and etching away a layer of the surface, leaving only the raised features 204b-204d and revealing the surface 214a. FIG. 2B shows that the alignment features 204b-204d can be recessed features. FIG. 2C shows a mixture of raised features 204b, 204d, and recessed features 204c, illustrating that any combination of raised or recessed alignment features can be formed, if needed. FIG. 2C also shows a suitably formed through hole 222 which can further facilitate attachment of a secondary object.

FIG. 3 shows a cantilever exemplar according to another aspect of the present invention. The cantilever 104 may have a series of etched through passages sufficiently large to ventilate the cantilever and thus permit easy flow of air or other gases through the cantilever. One or more perforations 302 or openings can be formed through the cantilever. The number, size, shape, and arrangement of openings can vary, depending on the requirements. For example, increasing the air flow by use of this ventilation scheme can reduce the total air resistance can and thus improve the Q or signal to noise ratio of the cantilever when used in resonant SPM scan such as non-contact scanning, intermittent contact scanning, or tapping mode scanning operations. Openings can be used to attain a desired flexibility (spring constant) in the cantilever. The openings may serve to reduce the mass of the cantilever, and so on. This cantilever design can improve signal to noise when certain Scanning Probe Microscopy methods are used in conjunction with the cantilever such as resonant non-contact Atomic Force Microscopy, Lateral Force Microscopy, and Magnetic Force Microscopy.

Figure 3A:
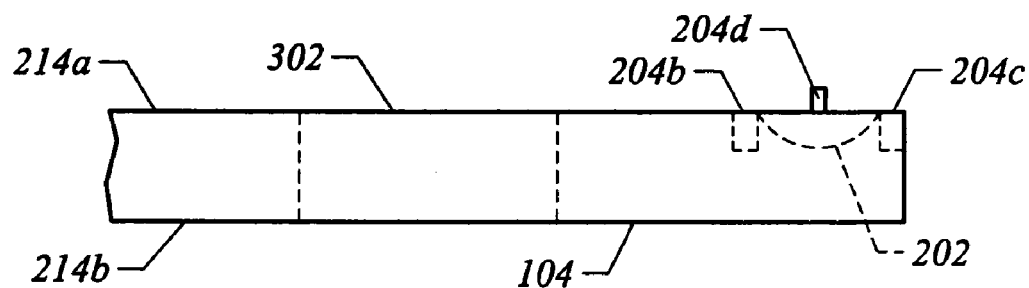
Figure 3B:
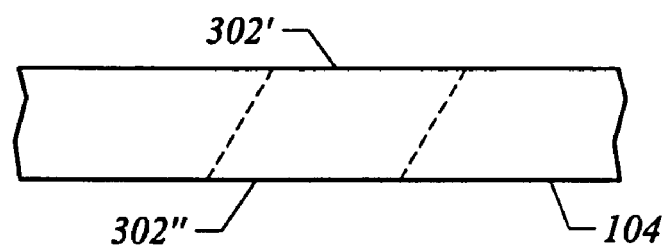

FIG. 3A shows an opening formed through the major surfaces 214a and 214b of the cantilever. FIG. 3B shows that the first opening 302' can be out of alignment with respect to the second opening 302", if a particular need requires for such a configuration. Incidentally, FIG. 3A shows another mixed combination of raised and recessed alignment features 204b-204d.

Figure 3C:
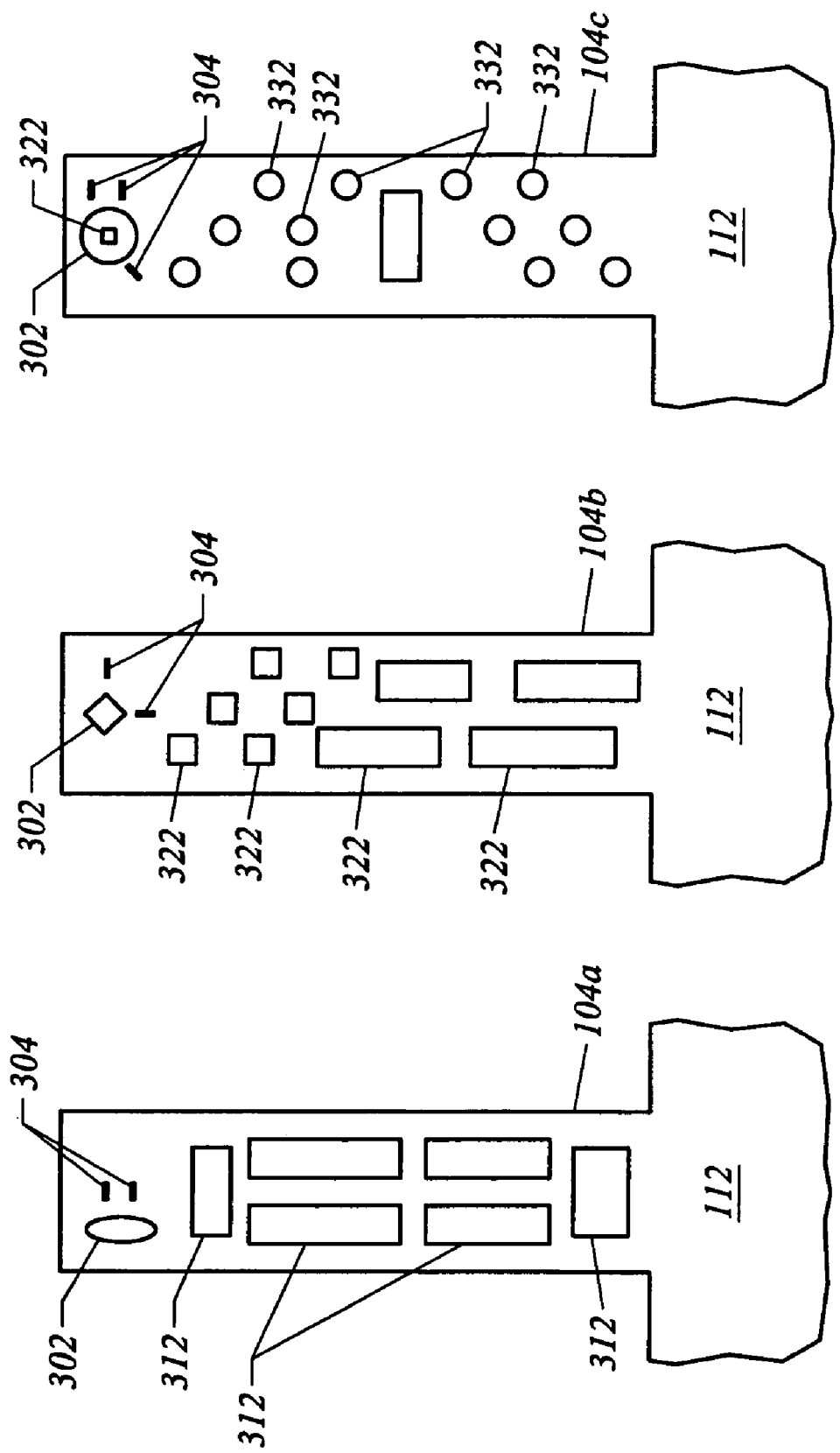

Perforations 302 can be formed such that the cantilever possesses a lattice structure. FIG. 3C shows various cantilever structures 104a, 104b, 104c having varying patterns of openings 312, 322, 332, respectively. These cantilever exemplars illustrate that any pattern of perforations can be provided to accommodate particular structural or operating characteristics of the cantilever.

Incidentally, FIG. 3C shows alternative configurations of recessed regions and alignment features. Recessed regions 302 can be any shape; for example, the figure shows a elongate shaped recessed region and a diamond shaped recessed region. The recessed region can be off-center or not. The figure shows a square-shaped through hole 322 as an example. The alignment features 322 can be asymmetrically arranged, or may not even be required. It can be appreciated from the various illustrated exemplars any configuration of recessed regions and alignment features can be provided to accommodate a particular application.

Cantilever assemblies 102 can be fabricated on different sized wafers. The larger wafers tend to be thicker than smaller wafers. Standard wafer sizes include 4, 6, 8, and 12 inch wafers, although non-standard wafers could be used. A larger wafer allows for higher production yields of cantilever assemblies. Cantilever assemblies with large dimensions may require a thicker substrate than a smaller sized cantilever assembly, thus requiring the use of thicker wafers. The result is a range of thickness dimensions when a family of cantilever assemblies are manufactured to accommodate different uses.

Figure 4:
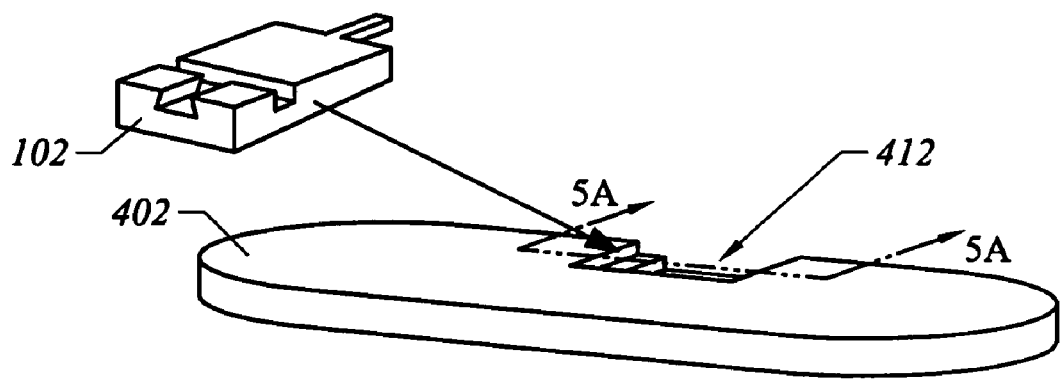
FIG. 4 is a schematic representation of a cantilever mounting plate according to the present invention.

FIG. 4 shows a mounting plate 402 having a compensating recessed region 412 formed in the plate. The compensating recessed region can be configured to accommodate dimensional differences among cantilever assemblies and by so doing can maintain a pre-selected positioning of the cantilever, measured for example from the backside of a cantilever relative to a reference.

Figure 5A:
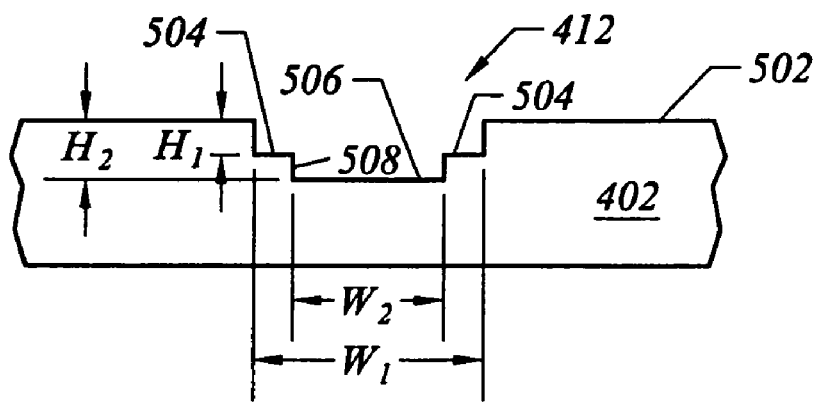
FIG. 5 is view of the mounting plate shown in FIG. 4 taken along view line 5-5.
Figure 5B:
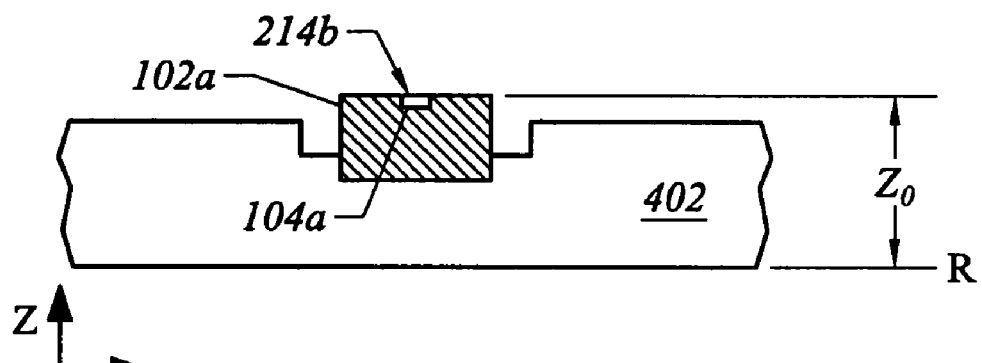
Figure 5C:
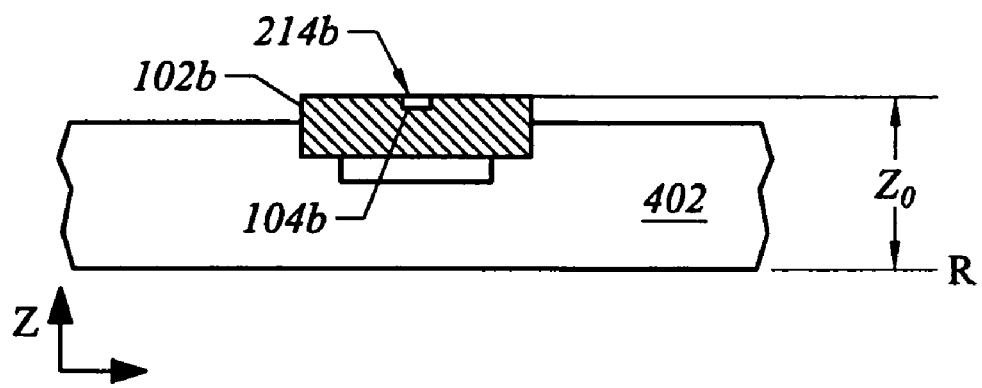

FIGS. 5A-5C show sectional views of the mounting plate 402 taken along view line 5-5 in FIG. 4. A cantilever assembly (not shown) can be mounted on a principal surface 502 of the mounting plate. However, in accordance with the invention, a recess is formed with a plurality of interior surfaces, e.g., surfaces 504, 506, and 508, configured to receive cantilever assemblies of varying dimensions. These surfaces comprise the compensating recessed region 412 of the mounting plate. The dimensions $W_1$, $H_1$ and $W_2$, $H_2$ of the receiving regions defined by the surface can be determined depending on the range of dimensions of the cantilever assemblies to be accommodated by the mounting plate.

For example, FIG. 5B shows a cantilever assembly 102a shown received in the region partially defined by surfaces 506, 508 of the mounting plate 402. The backside 214b of the cantilever 104 is measured relative to a reference surface, R. Typically, the measurement is made relative to a surface to be scanned. As a matter of convention the direction of the measurement can be considered to be in the Z-direction. The distance is shown as $Z_0$. FIG. 5C shows a second cantilever assembly 102b having different dimensions. The region partially delimited by surfaces 504 has an appropriate width dimension to receive the larger cantilever. Moreover, the depth dimension ($H_1$) is such that the backside 214b of the cantilever 104b has a Z-direction measurement of $Z_0$.

Thus in operation, the body dimensions of a cantilever assembly can be chosen along with the dimensions of a recess in the mounting plate 402 to place the back side of the cantilever in the same plane (relative to the Z-direction) regardless of its overall part thickness without affecting the overall operation of the entire instrument. It can be appreciated further that in addition to variations in part thickness among cantilever assemblies, variations in the Z-direction position of the cantilever 104 relative to its main body 112 among cantilever assemblies can be compensated for in the same manner by properly adjusting the Z-direction dimension (H) of the corresponding receiving region. Thus, standard wafer thicknesses such as 525 microns, 625 microns etc. can be accommodated without affecting the interchangeability of the instrument. It can also be appreciated that non-flat surfaces appropriately configured and dimensioned can be used instead of or in combination with the flat surface exemplars shown in FIGS. 5A-5C.

Figure 6:
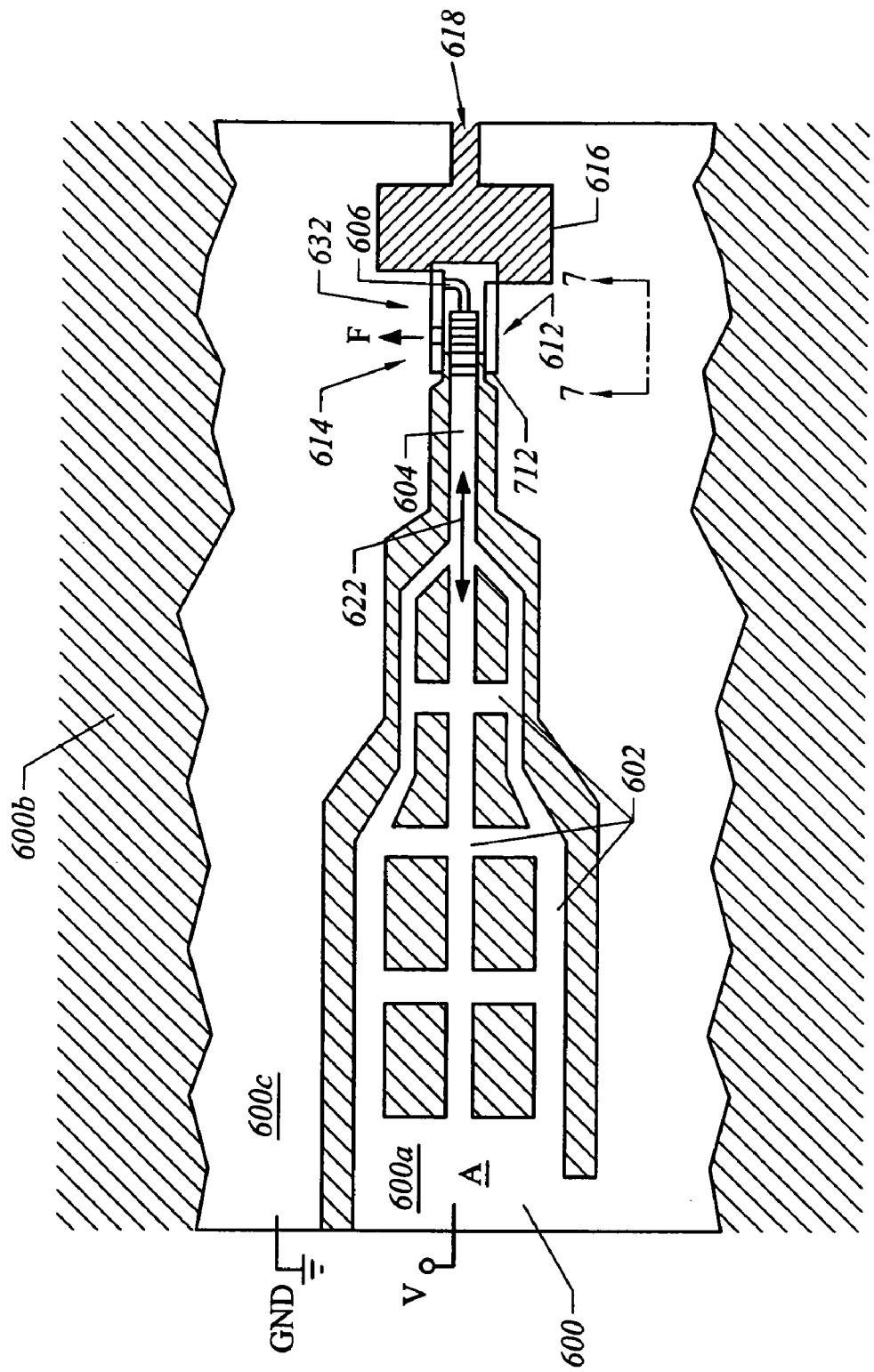
FIG. 6 is a schematic representation of gear pump according to an aspect of the present invention.

FIG. 6 schematically represents an illustrative embodiment of a high pressure gear pump MEMS according to an aspect of the present invention. A gear drive assembly 600 provides a driving force to actuate gears in a gear box assembly 612. In the particular embodiment shown in the figure, the gear drive exemplar includes a translation section comprising a plurality of expanding members 602 arranged in a lattice-like structure. A gear rack 604 is provided at a distal end of the lattice structure.

In a particular embodiment of the invention, the fabrication of the gear drive 600 can be fabricated as disclosed in pending U.S. patent application Ser. No. 10/094,408. Briefly, the gear drive can be formed on a silicon on insulator (SOI) wafer. The upper surfaces 600a and 600c are the silicon layer spaced apart by a layer of insulation (not shown) from an underlying substrate 600b. The lattice structure can be defined photolithographically. An isotropic etch process applied in the regions of the expanding members 602 can remove the underlying insulation layer thus creating a suspended lattice structure fixed at a region A. The silicon layer is partitioned into two zones 600a and 600c. A ground potential can be applied to one zone (e.g., 600c) and a voltage source V can be applied to the other zone (e.g., 600a). A return path segment of silicon 606 provides a return path for electric current to complete the electrical circuit from the voltage source V to ground. The flow of current will cause thermal expansion of the translation section (expanding members 602) due to heat generated by the flowing current. The expansion will occur in all directions, however, the geometry of the lattice structure will produce a more pronounced expansion in the direction along arrow 622. Removing the current will cause the translation section to contract as cooling occurs, again along the direction of arrow 622. Repeated application and removal of current can produce a reciprocal motion 622 of the gear rack 604.

A pump room 632 houses a gear assembly 612. The gear rack 604 engages the gear assembly to drive the gears (FIG. 7A) by the reciprocating motion 622 of the translation section. A fluid reservoir 616 provides a source of fluid which can be pumped through a suitably formed orifice 614 in the direction F. Fluid can be provided from an external source to the reservoir through an inlet 618. FIG. 6 represents the orifice 614 in schematic fashion, illustrating the principle of the fluid pump. It can be appreciated that a suitable connection or channel can be provided to deliver the pumped fluid to a destination.

Figure 7A:
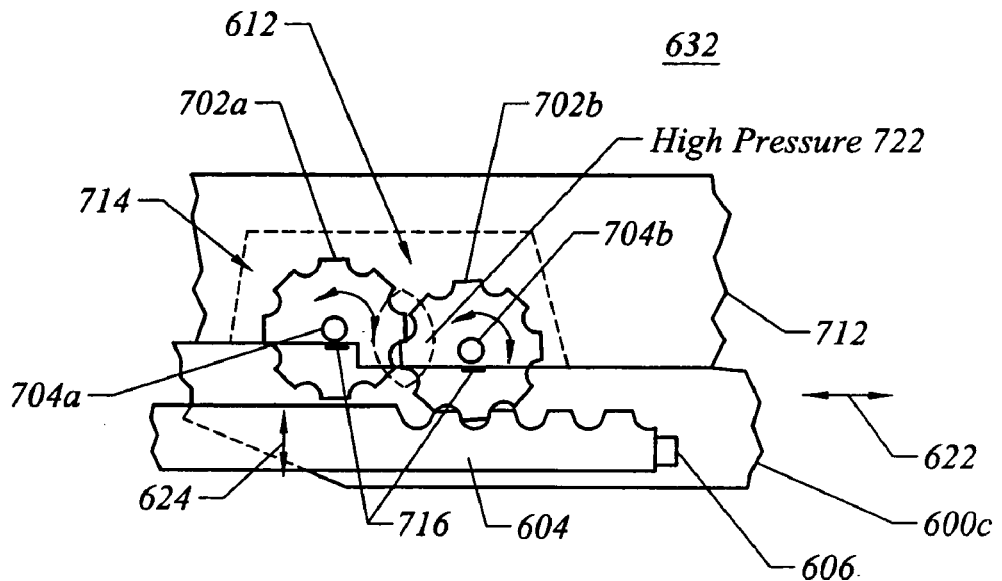
FIGS. 7A-7C are additional detailed views of the gear assembly shown in FIG. 6.

FIG. 7A shows a cutaway view of the pump room 632 view in the direction of view line 7-7 shown in FIG. 6. A pump casing 712 houses the gear assembly 612 in a pump chamber 714. This views shows a portion of zone 600c of the silicon layer. The gear assembly comprise a first gear 702a and a driven gear 702b in mesh with the first gear. Each gear has a gear shaft 704a and 704b, respectively which is supported on bearing journals 716 formed on the silicon layer 600c. The gear rack 604 is shown engaging the driven gear. The reciprocating motion 622 will cause the gears to rotate in a reciprocating fashion. To complete the description of the figure, the return path segment 606 is shown. The areas of contact where the gears mesh form high pressure points, thus defining a high pressure area 722 in that region.

Figure 7B:
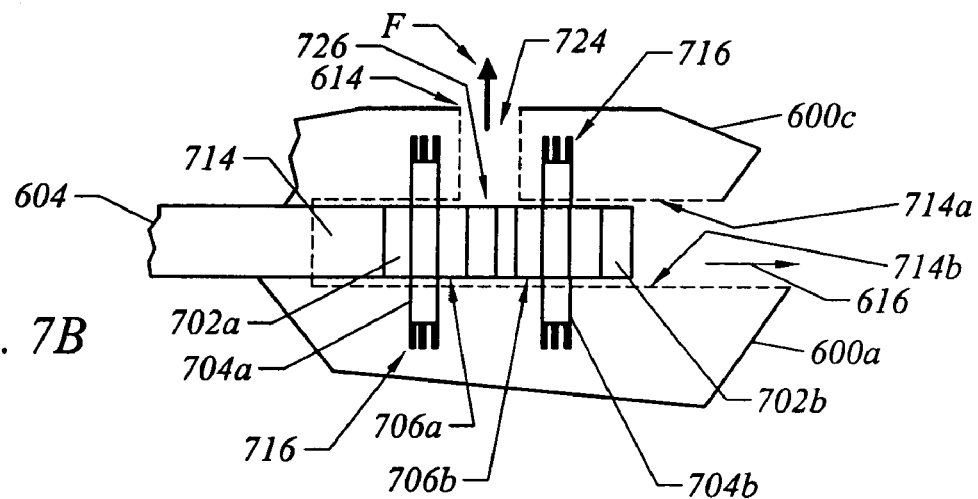

FIG. 7B shows a cutaway view of the pump room 632 seen from the top. It can be seen that portions of material in zone 600a and zone 600c of the silicon layer serve as journal bearings 716 on which the gear shafts 704a and 704b are supported. The journal bearings can be round or cylindrically shaped bearing surface, or V-shaped surfaces (e.g., 55° V-shapes). The gears 702a and 702b are placed on the journals within the pump chamber 714 of the pump room, allowing the gears to turn multiple revolutions or less then one revolution, depending on the stroke length of the gear rack 604. In an particular embodiment, the gears can be inserted into journals formed in the pump chamber. The pump casing 712 can be provisioned with opposing journals and a suitable channel to direct the high pressure flow can be placed over the pump chamber. It can be appreciated, however, that many other arrangements are possible.

From the top view, it can be seen that the chamber is in fluid connection with the reservoir 616. Walls 714a and 714b of the chamber 714 are closely spaced from the faces 706a, 706b respectively of gears 702a and 702b, leaving substantially only the gear teeth being exposed to the interior volume of the chamber. A channel 724 fluidically couples an opening 724 in the chamber 714 to the orifice 614. The channel in a given particular embodiment can be directed as appropriate to some other suitable structure or destination. The channel can be about 50 microns to 1 nanometer in width.

Fluid from the reservoir is picked up by the gear teeth when the gears rotate. The fluid is forced by the action of the gear teeth into the high pressure area 722. The channel 724 is aligned with respect to the high pressure area allowing the high fluid pressure present to escape via the channel 724. The constrained spacing between the chamber walls 714a, 714b and the gear faces 706a, 706b creates a region of high flow resistance, thus preventing significant flow of fluid back into the chamber from the high pressure region and ensuring a flow of fluid through the channel. It can be appreciated that the chamber walls do not have to extend across the entire face of the gears. In the case of a pump, it is sufficient that a region about the chamber opening 724 is sufficiently covered as to restrict the flow fluid from the chamber opening back to the reservoir 714.

Referring to FIGS. 6 and 7A, it another aspect of the invention an escape mechanism (not shown) can be employed to selectively disengage the gear rack 604 from the gear assembly 612, for example, by moving the rack up and down (arrow 624). Thus, for example, the gear rack can be engaged during the forward (or reverse) stroke of the reciprocal motion and the disengaged during the reverse (or forward) stroke. This would cause each gear to rotate continuously in one direction. However, in the currently shown embodiment, the pump can be effective from just the back and forth rolling of the gears when no such escape mechanism is used. Also it can be appreciated that alternate drive mechanisms other than the described thermal mechanism can be used to drive the gear assembly. For example, a suitable electrostatic comb drive, a piezoelectric drive, or a piezoresistive drive, a rotating electrostatic motor, and other similar devices can be used. Incorporating an escape mechanism to produce unidirectional gear rotation, however, can be useful in other applications.

Figure 7C:
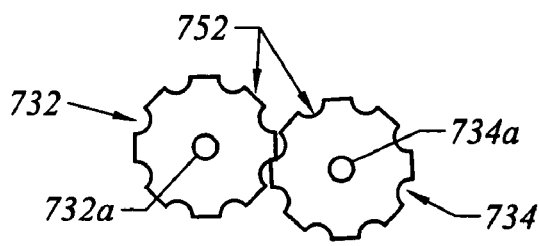

FIG. 7C shows additional detail of the gears 702a and 702b comprising the gear assembly 612. In accordance with a particular embodiment of the invention, the gears are made of an obdurate low stiction material 752 (like diamond) interacting with another similar material or with silicon. In the particular embodiment shown, each gear 732, 734 can be a diamond gear with integral shaft 732a, 732b fabricated using nanolapping diamond coating techniques more fully discussed in pending U.S. patent application Ser. No. 10/094,411 and in U.S. patent application Ser. No. 10/094, 149. In accordance with the invention, each gear has a maximum surface area less than 1 mm$^2$.

Figure 8:
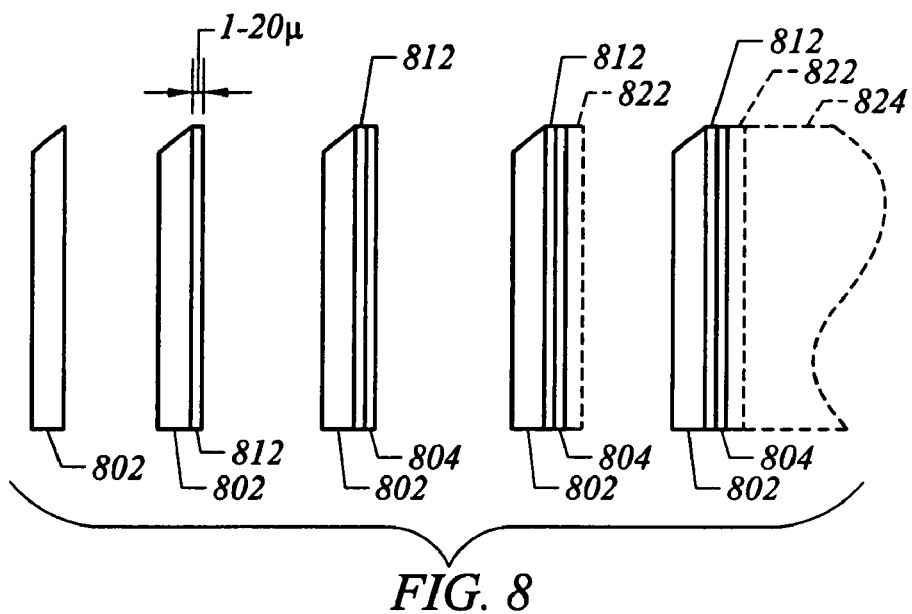
FIG. 8 illustrate the general steps for fabricating a knife edge in accordance with an embodiment of the invention.

A diamond coating can also be provided onto a substrate to form tools. The generalized fabrication sequence shown in FIG. 8 diagrammatically illustrates a substrate 802 having a coating of diamond 812 formed thereon. The substrate material can be titanium (or some tungsten-based compound), titanium aluminum vanadium (or some other titanium-based compound), silicon, tungsten or any very low cobalt metal ceramic carbide or nitride. The diamond coating can have a thickness of 1-20 microns. An overcoat coating 804 can be provided on the diamond coating. The overcoat coating can be titanium or tungsten followed by an optional bonding layer 822 (indicated by phantom lines) such as nickel and an optional companion substrate of (typically) titanium 824 (also indicated by phantom lines).

A diamond edge can be formed by performing a sharpening operation on the layered structure. As the tough matrix material of metal(s) and/or ceramic(s) is removed during the sharpening process the thin hard diamond film, which is already sufficiently thin as to be very sharp, is exposed for the cutting operation. The resulting diamond edge can then serve as the leading surface used in a cutting operation. The quality and sharpness of an edge depends on its hardness. The diamond layer provides the material to present a superhard edge supported by a robust matrix of tough metal(s) and/or ceramic(s), as indicated above.

Figures 10A, 10B:
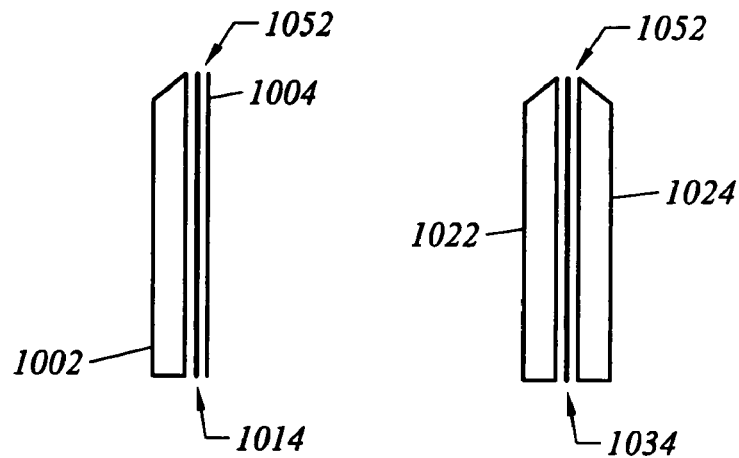
FIGS. 10A and 10B illustrate different knife-edge embodiments.

Referring to FIGS. 10A and 10B for a moment, the resulting sandwich can result in two kinds of knife. A first knife assembly 1052 illustrated in FIG. 10A comprises a diamond layer 1014 forming a very thin blade having a sharp edge by virtue of the diamond layer being thin. The diamond edge can be covered by a thin (1 to 3 micron) layer of titanium and/or tungsten.

Alternatively, a second knife assembly 1054 shown in FIG. 10B comprises an optional thick substrate 1024 which can be glued or thermally bonded to the over coated titanium and nickel layer to form a rugged cutting edge with the diamond layer 1034. In this particular embodiment, the diamond layer is rigidly protected in the middle of the knife assembly by the metal layers. However, the metal must be carefully sharpened and shaped to insure that the diamond is properly exposed to serve as a superhard edge.

Returning to FIG. 8, if the coated substrate 802 is too thin the diamond film may through shrinkage (or expansion) induce a warping effect on the substrate. The substrate can be preformed to exhibit a complementary warped shape in order to compensate for the expected the warpage due to the diamond layer. Alternatively, the substrate can be coated on the back of the side to provide a reverse warping effect (bending forces in the opposite direction) and then coated with titanium or tungsten.

Depending on the coating material and its expansion coefficient with respect to the surface to be coated, it is possible to selectively produce either an expansion induced warp or a contraction induced warp. For example, suppose a non-expanding or low-expansion rate glass is coated onto a high expansion piece of copper at an elevated temperature $T_A$. Then as the system cools, the contracting copper will compress the glass and may bend or shatter it. If the glass bond and the glass is weak enough (thin enough) and the copper relative to the glass is strong or thick enough, the glass may curve its edges inward toward the copper center. In the case of diamond on silicon, a very thin layer diamond (for example, a diamond layer a hundred times thinner than the silicon substrate) can cause bending of the silicon toward the center of the diamond layer as the materials cool, due to different coefficients of expansion of diamond and silicon, and due to the very high molecular bond strength diamond as compared to the bond strength of silicon.

Figure 9:
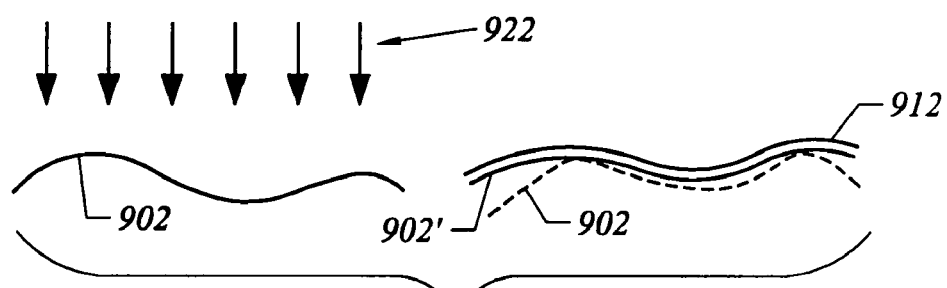
FIG. 9 schematically illustrates the shaping of a substrate according to the invention.

FIG. 9 schematically illustrates this aspect of the invention with a generic "pre-shaped" substrate that is suitable for deposition of a diamond layer to produce a desired shape (or surface contour) while taking into account the thermal cooling induced warping effect of diamond layer. A starting substrate material 902 can be formed to possess a predefined shape or surface contour. It can be understood that the pre-shaping can be performed by any of a number of conventional techniques; e.g., machining, grinding, chemical etching, and so on.

It is noted that the starting substrate material needs not be pre-stressed. However, it can be appreciated that a pre-stressing step can be performed so that when the re-shaping takes place, the stress of the re-shaped substrate can be compensated, either by adding more stress or reducing it as needed for a particular application.

A diamond deposition 922 step is performed to produce a diamond layer 912 atop the substrate. Techniques for forming a suitable coating of diamond are known. As can be expected, the diamond layer will stress the substrate 902 as it crystallizes, thus pulling the pre-shaped form of the substrate 902 into a new shape 902'. It is noted that the final shape need not be a flat surface, though a flat surface may be desirable. It can be appreciated that any desired surface contour can be achieved by properly pre-shaping the starting substrate material and depositing the diamond layer and varying its thickness to obtain a certain degree of re-shaping effect.

It can be appreciated that additional diamond layers can be provided to further effect shaping of the surface contour due to the warping effect of the diamond layers. For example, a diamond coating can be deposited on a first surface of the substrate, followed by another diamond coating deposited on the surface opposite the first surface, to compensate for the warping of the first diamond layer. Selected areas on a first side of substrate can be treated to form one or more diamond coatings at those selected surface areas, to effect control of contour shape.

What is claimed is:

1. A cantilever assembly suitable for use in a scanning probe microscope (SPM) comprising a holder and a single lever extending from a single location on the holder, the single lever having a first major surface and a second major surface spaced apart from the first major surface and in parallel relation to the first major surface, the single lever further having an end portion distal the holder, the single lever further including a plurality of openings formed through the first major surface and the second major surface, each opening spaced apart from the holder.

2. The cantilever assembly of claim 1 wherein the SPM is an atomic force microscope, or a lateral force microscope, or a magnetic force microscope.

3. The cantilever assembly of claim 1 wherein a spring constant associated with the cantilever structure is determined based on the one or more openings.

4. A cantilever assembly suitable for use in a scanning probe microscope (SPM) comprising a holder and a single lever, the single lever having a single connection to the holder, the single lever extending from the holder, the single lever having a first major surface, the single lever further having an end portion distal the holder, wherein the single lever is ventilated using a plurality of openings, each opening spaced apart from the holder.

5. The cantilever assembly of claim 4 as used in atomic force microscopy, lateral force microscopy, or magnetic force microscopy.

6. A cantilever assembly suitable for scanning probe microscopy, the cantilever assembly comprising a main body portion and a single flexible member extending from the main body portion, the single flexible member having a single connection to the main body portion and having a free end distal the main body portion, the single flexible member having a perforated structure comprising perforations formed through the perforated structure that are spaced apart from the main body portion.

7. The cantilever assembly of claim 6 wherein the flexible member comprises a first major surface and a second major surface spaced from the first major surface and parallel to the first major surface, the perforated structure comprising one or more openings formed through the first major surface and through the second major surface of the flexible member.

8. The cantilever assembly of claim 6 as used in atomic force microscopy, lateral force microscopy, or magnetic force microscopy.

\* \* \* \* \*